United States Patent
Kita et al.

(10) Patent No.: US 9,194,050 B2
(45) Date of Patent: Nov. 24, 2015

(54) FLUORINE GAS GENERATOR

(75) Inventors: Takuya Kita, Ube (JP); Tatsuo Miyazaki, Ube (JP); Akifumi Yao, Ube (JP)

(73) Assignee: Central Glass Company, Limited, Ube-shi (JP)

( * ) Notice: Subject to any disclaimer, the term of this patent is extended or adjusted under 35 U.S.C. 154(b) by 36 days.

(21) Appl. No.: 14/112,850

(22) PCT Filed: May 17, 2012

(86) PCT No.: PCT/JP2012/062592
§ 371 (c)(1),
(2), (4) Date: Oct. 18, 2013

(87) PCT Pub. No.: WO2012/169330
PCT Pub. Date: Dec. 13, 2012

(65) Prior Publication Data
US 2014/0083844 A1    Mar. 27, 2014

(30) Foreign Application Priority Data
Jun. 10, 2011    (JP) .................................. 2011-129663

(51) Int. Cl.
| | |
|---|---|
| C25B 1/24 | (2006.01) |
| C25B 1/00 | (2006.01) |
| C25B 3/08 | (2006.01) |
| C25B 9/00 | (2006.01) |
| C25C 3/08 | (2006.01) |

(Continued)

(52) U.S. Cl.
CPC ............... *C25B 9/00* (2013.01); *B01D 53/0407* (2013.01); *B01D 53/685* (2013.01); *C01B 7/20* (2013.01); *C25B 1/245* (2013.01); *C25B 15/08* (2013.01); *B01D 2253/112* (2013.01); *B01D 2256/26* (2013.01); *B01D 2257/2047* (2013.01)

(58) Field of Classification Search
CPC ............ C25B 1/24; C25B 1/245; C25B 3/08; C25B 1/00; C25B 9/00; C25C 3/08
USPC .......... 204/193, 194, 242; 205/286, 395, 396, 205/460, 619
See application file for complete search history.

(56) References Cited

U.S. PATENT DOCUMENTS

| | | | |
|---|---|---|---|
| 2002/0088347 A1* | 7/2002 | Kinsel | ............................. 96/139 |
| 2009/0056542 A1 | 3/2009 | Carew | |
| 2012/0031752 A1* | 2/2012 | Mori et al. | .................... 204/247 |

FOREIGN PATENT DOCUMENTS

| | | |
|---|---|---|
| EP | 2 423 354 A1 | 2/2012 |
| JP | 62-171728 | 7/1987 |

(Continued)

OTHER PUBLICATIONS

International Search Report (PCT/ISA/210) with English translation dated Aug. 21, 2012 (Five (5) pages).

(Continued)

*Primary Examiner* — Zulmariam Mendez
(74) *Attorney, Agent, or Firm* — Crowell & Moring LLP

(57) ABSTRACT

A fluorine gas generating device 100 which is characterized by having a cylindrical member 31a for circulating therein the main-product gas, a gas feed port 51a for introducing the main-product gas into the cylindrical member 31a, a gas discharge port 52a for discharging the main-product gas from the cylindrical member 31a, an adsorbent holding member 201 arranged in the cylindrical member 31a to form a space to provide a channel for the main-product gas circulated in the cylindrical member 31a, a stirring blade 202 for stirring the main-product gas that is introduced through the gas feed port 51a, and a gas flow guiding cylinder 203 for circulating or diffusing the main-product gas in the space within the cylindrical member 31a.

3 Claims, 2 Drawing Sheets

(51) Int. Cl.
*C25B 15/08* (2006.01)
*C01B 7/20* (2006.01)
*B01D 53/68* (2006.01)
*B01D 53/04* (2006.01)

(56) References Cited

FOREIGN PATENT DOCUMENTS

| JP | 9-276649 A | 10/1997 |
|---|---|---|
| JP | 2002-102649 A | 4/2002 |
| JP | 2007-190544 A | 8/2007 |
| JP | 2009-215588 A | 9/2009 |
| WO | WO 2010/143464 A1 | 12/2010 |

OTHER PUBLICATIONS

International Written Opinion (PCT/ISA/237) dated Aug. 21, 2012 (Three (3) pages).
Extended European Search Report dated Feb. 9, 2015 (four (4) pages).

* cited by examiner

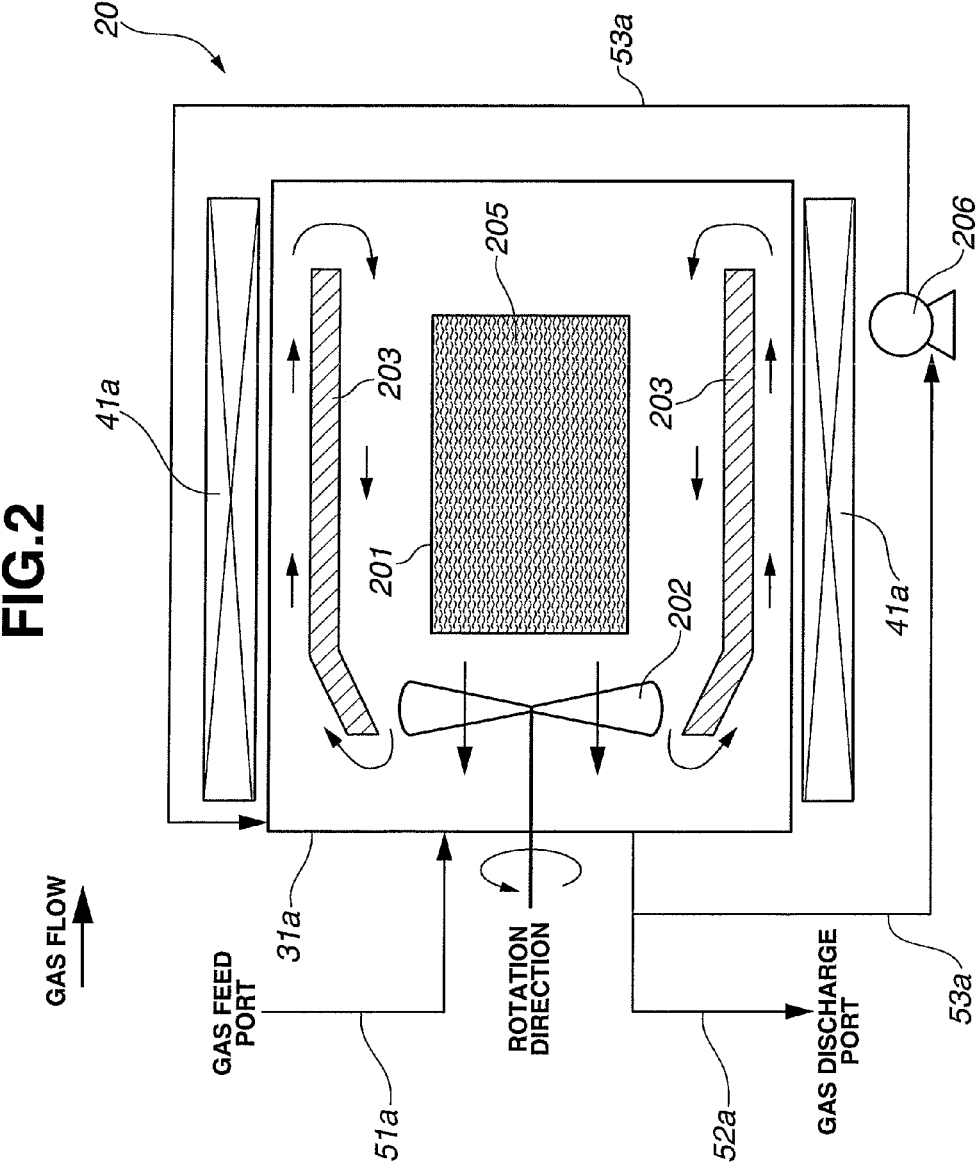

FLUORINE GAS GENERATOR

TECHNICAL FIELD

The present invention relates to fluorine gas generators or fluorine gas generating devices of a type that is able to efficiently use adsorbent without waste.

BACKGROUND ART

Hitherto, a fluorine gas generating device has been known which comprises an electrolytic tank that electrolyzes hydrogen fluoride in an electrolytic bath including a molten salt containing therein hydrogen fluoride and generates at an anode side thereof a main-product gas containing as a main component fluorine gas and at a cathode side thereof a by-product gas containing as a main component hydrogen gas.

In fluorine gas generating devices of this type, in the fluorine gas generated at the anode side of the electrolytic tank, there is mixed a hydrogen fluoride gas (HF) vaporized from the molten salt. Accordingly, for refining the fluorine gas by separating or removing the hydrogen fluoride from the gas generated at the anode side, there is provided a refining device that is equipped with a detoxifying tower filled with an adsorbent (detoxifier) such as sodium fluoride (NaF) or the like.

In the fluorine gas and hydrogen gas generated in the electrolytic tank, there are mixed hydrogen fluoride evaporated from the molten salt contained in electrolytic tank and mist components of the molten salt itself. However, such components cause deterioration of the adsorbent. Particularly, because of contact with a highly concentrated hydrogen fluoride, it tends to occur that the adsorbent placed near an inlet of the detoxifying tower becomes solidified due to fusion or pulverized due to volumetric expansion, which causes clogging of the adsorbent. Once the adsorbent clogging occurs, a gas flow is blocked and clogging of the detoxifying tower is induced, which have been practical problems.

In order to solve the above-mentioned problems, Patent Document-1 discloses a technique in which to a fluorine gas generating device equipped with a detoxifying tower filled with adsorbent such as sodium fluoride (NaF) or the like, there is provided a separation means to define a space between a gas feed port and the adsorbent, so that droplets of mist component are scattered and settled down in the space to make it difficult to effect contact between the adsorbent and the mist component of the molten salt thereby suppressing clogging of the adsorbent and thus reducing the frequency of maintenance of the detoxifying tower.

PRIOR ART DOCUMENTS

Patent Documents

Patent Document-1: Japanese Laid-open Patent Application (tokkai)2009-215588

DISCLOSURE OF INVENTION

Problems to be Solved by Invention

However, in the construction of the detoxifying tower that is densely filled with adsorbent such as shown by Patent Document-1, once the adsorbent placed near the gas inlet opening is subjected to clogging, the detoxifying tower becomes clogged without allowing the adsorbent near the gas inlet opening to sufficiently adsorb HF. Once the detoxifying tower is clogged, it becomes necessary to dismantle the detoxifying tower and change entire amount of the adsorbent contained in the detoxifying tower.

When it is needed to change the adsorbent by dismantling the detoxifying tower, it is common to throw out the entire amount of the adsorbent that may still contain useful adsorbent that has not adsorbed HF sufficiently. This waist treatment has been made in order to assure the quality of a replaced adsorbent that would be contaminated with impurities if the used adsorbent is left.

Thus, in the technique disclosed by Patent Document-1, there is inevitably produced a loss of adsorbent at the time of changing or replacing the adsorbent, which is caused by the disposal of the adsorbent that has not adsorbed HF sufficiently. That is, it has been difficult to usefully and effectively use the entire amount of the adsorbent contained in the detoxifying tower.

The present invention is provided by taking the above-mentioned problems into consideration and aims to provide a fluorine gas generating device that is able to usefully and effectively use an adsorbent that adsorbs and separates hydrogen fluoride.

Means for Solving Problems

According to the present invention, there is provided a fluorine gas generating device that generates fluorine gas by electrolyzing hydrogen fluoride in molten salt containing the hydrogen fluoride, the fluorine gas generating device comprising an electrolytic tank that generates at an anode side a main-product gas containing as a main component fluorine gas and at a cathode side a by-product gas containing as a main component hydrogen gas by electrolyzing hydrogen fluoride in an electrolytic bath that includes molten salt containing therein hydrogen fluoride; and a refining device that removes the hydrogen fluoride mixed with the main-product gas by using adsorbent, in which the refining device comprises a cylindrical member for circulating therein the main-product gas, a gas feed port for introducing the main-product gas into the cylindrical member, a gas discharge port for discharging the main-product gas from the cylindrical member, an adsorbent holding member arranged in the cylindrical member to form a space to provide a channel for the main-product gas circulated in the cylindrical member, a stirring means for stirring the main-product gas that is introduced through the gas feed port, and a gas flow guiding cylinder for circulating or diffusing the main-product gas in the space within the cylindrical member.

In the present invention, it is preferable that the gas flow guiding cylinder has a tubular shape with both ends opened and the gas flow guiding cylinder is arranged in the cylindrical member to extend along an inner surface of the cylindrical member.

Furthermore, in the present invention, it is preferable that the stirring means is placed between the gas feed port and the adsorbent holding member with respect to a direction in which the main-product gas led from the gas feed port flows.

Furthermore, in the present invention, a circulation channel may be employed by which part of the main-product gas discharged from the cylindrical member is circulated and thereafter led into the cylindrical member again.

Effects of Invention

According to the invention, in the interior space of the cylindrical member through which the main-product gas flows, there are provided means for stirring the main-product gas in the interior space and the gas flow guiding cylinder for effectively circulating or diffusing the main-product gas. Thus, deterioration of the adsorbent caused by the direct contact of the adsorbent with the highly concentrated hydrogen fluoride can be suppressed. Accordingly, it is possible to provide a fluorine gas generating device in which the adsorbent can be used effectively without waste of it.

BRIEF DESCRIPTION OF DRAWINGS

FIG. 2 is a schematic diagram of a refining device employed in the fluorine gas generating device of the embodiment of the invention.

BEST EMBODIMENT OF INVENTION

Figure 1:
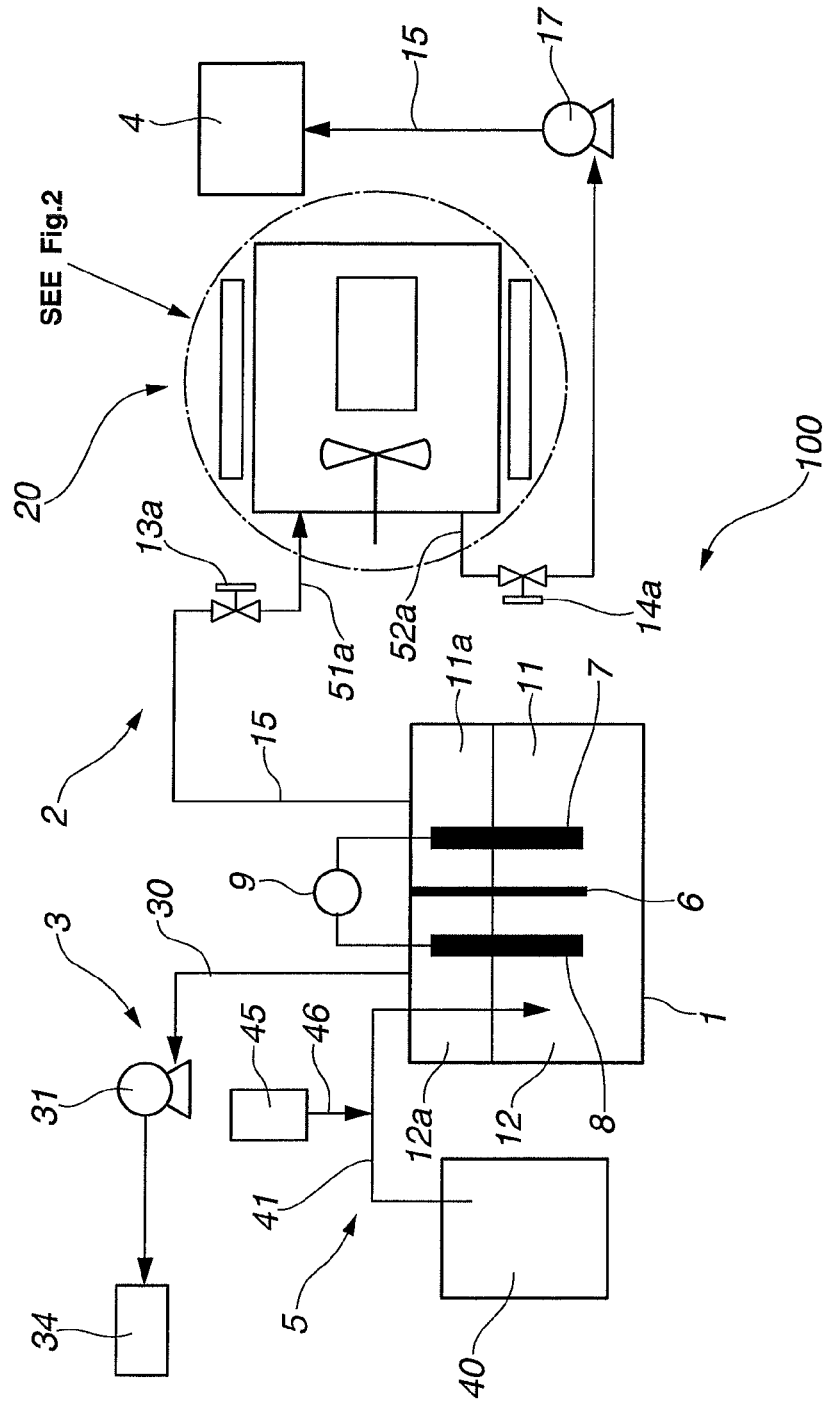
FIG. 1 is a block diagram of a fluorine gas generating device which is an embodiment of the present invention.

In the following, an embodiment of the present invention will be described with reference to the accompanying drawings. A fluorine gas generating device 100 of an embodiment of the present invention will be described.

The fluorine gas generating device 100 is a device that generates fluorine gas by subjecting molten salt containing hydrogen fluoride to electrolysis and feeds the generated fluorine gas to an external device 4. As the external device 4, a semiconductor manufacturing apparatus is exemplified. In this case, fluorine gas is used as cleaning gas during manufacturing is process of the semiconductor.

The fluorine gas generating device 100 comprises an electrolytic tank 1 that generates fluorine gas with the aid of electrolysis, a fluorine gas feeding system 2 that supplies the fluorine gas generated by the electrolytic tank 1 to the external device 4 and a by-product gas treating system 3 that treats a by-product gas generated at the time when the fluorine gas is generated.

First, the electrolytic tank 1 will be described. In the electrolytic tank 1, there is received molten salt that contains hydrogen fluoride (HF). By changing composition of the molten salt received in the electrolytic tank 1, composition of fluorine compound gas generated by the electrolytic tank 1 can be suitably changed. As the molten salt, there is used a salt with a composition indicated by a general formula $KF.nHF$ (n=0.5 to 5.0). When $NH_4F.HF$ molten salt is used, there is obtained nitrogen trifluoride ($NF_3$) and when $NH_4F.HF.HF$ molten salt is used, there is obtained a mixture of $F_2$ and $NF_3$. In the following, description will be directed to an embodiment in which as the molten salt, mixed molten salt ($KF.2HF$) of hydrogen fluoride and potassium fluoride is used.

An interior of the electrolytic tank 1 is divided into an anode chamber 11 and a cathode chamber 12 by a partition wall 6 that is embedded in the molten salt. Into the molten salt in the anode chamber 11 and the molten salt in the cathode chamber 12, there are respectively embedded anode 7 and cathode 8. Between the anode 7 and the cathode 8, there is applied a current from an electric power source 9. With this, at the anode 7, there is generated a main-product gas that contains fluorine gas ($F_2$) as a main component, and at the cathode 8, there is generated a by-product gas that contains hydrogen gas as a main component. For the anode 7, a carbon electrode is used and for the cathode 8, soft iron, monel metal or nickel is used.

Above a level of the molten salt in the electrolytic tank 1, there are defined a first air chamber 11a into which the fluorine gas generated at the anode 7 is led and a second air chamber 12a into which the hydrogen gas generated at the cathode 8 is led. Due to provision of the partition wall 6, the first and second air chambers 11a and 12a are not fluidly communicated, so that gases in the two chambers 11a and 12a are not allowed to flow into the opposed chambers. That is, the first air chamber 11a and the second air chamber 12a are completely isolated from each other by the partition wall 6 for preventing a reaction caused by contact between the fluorine gas and the hydrogen gas. While, the molten salt in the anode chamber 11 and that in the cathode chamber 12 are connected to each other through a part below the partition wall 6 without being divided by the partition wall 6.

The fusing point of KF.2HF is 71.7° C., and thus, it is preferable to adjust the temperature of the molten salt at 91 to 93° C. Into the fluorine gas and hydrogen gas respectively generated at the anode 7 and cathode 8 in the electrolytic tank 1, there are mixed hydrogen fluoride by an amount corresponding to its vapor pressure, the hydrogen fluoride being vaporized from the molten salt. Like this, the fluorine gas generated at the anode 7 and led into the first air chamber 11a and the hydrogen gas generated at the cathode 8 and led into the second air chamber 12a have a hydrogen fluoride gas contained herein.

In the following, the fluorine gas feeding system 2 will be described. To the first air chamber 11a, there is connected a first main passage 15 for supplying the fluorine gas to the external device 4.

To the first main passage 15, there is provided a first pump 17 for pumping up the fluorine gas from the first air chamber 11a and leading the gas to the external device. As the is first pump 17, a displacement pump such as bellows pump, diaphragm pump or the like is used. At a part of the first main passage 15 upstream of the first pump 17, there is provided a refining device 20 that refines the fluorine gas by catching or collecting hydrogen fluoride mixed in the fluorine gas. The detail of the refining device 20 will be described hereinafter.

In the following, the by-product gas treating system 3 will be described. To the second air chamber 12a, there is connected a second main passage 30 for discharging the hydrogen gas to the outside.

To the second main passage 30, there is provided a second pump 31 for pumping up the hydrogen gas from the second air chamber 12a and leading the gas to a given external device. At a part of the second main passage 30 downstream of the second pump 31, there is provided a detoxifying portion 34, so that the hydrogen gas pumped up by the second pump 31 is allowed to remove or release the hydrogen fluoride at the detoxifying portion 34 and thus the hydrogen gas is detoxified before it is discharged.

The fluorine gas generating device 100 is provided with a material feeding system 5 that feeds and replenishes the molten salt in the electrolytic tank 1 with hydrogen fluoride that is a material of fluorine gas. In the following, the material feeding system 5 will be described.

The electrolytic tank 1 is connected through a material feeding passage 41 to a hydrogen fluoride feeding source 40 from which hydrogen fluoride is fed to the electrolytic tank 1. The hydrogen fluoride stored in the hydrogen fluoride feeding source 40 is fed through the material feeding passage 41 to molten salt in the electrolytic tank 1.

To the material feeding passage 41, there is connected a carrier gas feeding passage 46 through which a carrier gas is led to the material feeding passage 41 from a carrier gas feeding source 45. The carrier gas is a gas for carrying hydrogen fluoride from the hydrogen fluoride feeding source 40 to the molten salt. As the carrier gas, nitrogen gas is used, which is inactive gas. The nitrogen gas is fed, together with hydrogen fluoride, to the molten salt in the cathode chamber 12. The nitrogen gas is hardly soluble in the molten salt and discharged to the outside from the second air chamber 12a through the second main passage 30.

In the following, the refining device 20 will be described. The refining device 20 is a device for causing the hydrogen fluoride mixed with fluorine gas to be adsorbed to adsorbent thereby to clear or release the hydrogen fluoride from the fluorine gas. In the following, the detail of the refining device 20 will be described with reference to FIG. 2.

As is seen from FIG. 2, the refining device 20 is equipped with a cylindrical member 31a through which a gas is circulated. To the cylindrical member 31a, there are connected a main-product gas feed port 51a through which fluorine gas generated at the anode 7 is led into the cylindrical member 31a and a main-product gas discharge port 52a through which the fluorine gas is discharged from the cylindrical member 31a. Within the cylindrical member 31a, there are installed an adsorbent holding member 201 that contains and holds adsorbent 205 for adsorbing the hydrogen fluoride, a stirring blade 202 (stirring means) that stirs the inflowing fluorine gas and a gas flow guiding cylinder 203 that effectively circulates and diffuses the fluorine gas in a space defined in the cylindrical member 31a.

The adsorbent holding member 201 is a tool for containing and holding a given amount of adsorbent 205 and is arranged in the cylindrical member 31a in a manner to define a space for forming a gas flow channel. With this gas flow channel, even if part of the adsorbent 205 is clogged, the gas can be circulated without being blocked. If desired, the adsorbent is holding member 201 may comprise a plurality of units that are spaced at given intervals.

Furthermore, in order to increase the rate of surface area of the adsorbent 205 to which the gas flowing in the cylindrical member 31a contacts, it is preferable to form the adsorbent holding member 201 with through openings (not shown). The through openings have no special restriction so long as the openings can hold the adsorbent 205 and have a size to permit passing of the gas therethrough. When considering the rate of surface area of the adsorbent 205 to which the gas contact, it is preferable that the adsorbent holding member 201 is formed into a porous or mesh shape.

The shape of the adsorbent holding member 201 has no special restriction so long as the member can define the gas flow channel in the cylindrical member 31a and contain and hold the adsorbent 205. For example, the adsorbent holding member may have a form in which a spherical or cylindrical cage made of wire mesh has the adsorbent 205 filled therein, a form in which a tray-like member such as a tray-type vessel has the adsorbent 205 filled therein or a form in which sheets of metal (which may include meshes of metal) put therebetween the adsorbent 205.

The method of installing the adsorbent holding member 201 in the cylindrical member 31a has no special restriction so long as a space for forming the gas flow channel can be defined. For example, the method may be a method in which the adsorbent holding member 201 is suspended in the inner space of the cylindrical member 31a or a method in which the member 201 is fixed to an inner wall of the cylindrical member 31a.

When considering practical handling matters, such as workability with which the adsorbent holding member 201 is machined to have through openings, easiness with which the member is set in the cylindrical member and easiness with which the member is filled with the adsorbent, it is specifically preferable that the adsorbent holding member 201 is formed into the tray-like member. It is to be noted that the tray-like member just mentioned is a flat container that is able to contain a body. The adsorbent holding member 201 may have various forms. That is, the shape of the member 201 may be suitably determined in accordance with the shape of the cylindrical member. That is, the member 201 may have a circular or rectangular shape in cross section, so long as the member can contain or hold the adsorbent.

The gas flow guiding cylinder 203 is a device that circulates or diffuses the inflowing fluorine gas in the inner space of the cylindrical member 31a with the aid of the stirring blade 202. The gas flow guiding cylinder 203 is a cylindrical member having both ends opened. The cylinder 203 has no special restriction on shape and may be suitably designed so long as it can circulate and diffuses the gas in the inner space. As is seen from FIG. 2, it is preferable that the gas flow guiding cylinder 203 is coaxially arranged in the cylindrical member 31a in such a manner that an outer cylindrical surface of the gas flow guiding cylinder 203 extends in a longitudinal direction of the cylindrical member 31a along an inner cylindrical surface of the cylindrical member 31a. With this arrangement, as is indicated by arrows in FIG. 2, the fluorine gas can be guided along the inner and outer cylindrical surfaces of the gas flow guiding cylinder 203, and thus, the fluorine gas can be more efficiently circulated and diffused.

The fluorine gas stirred by the stirring blade 202 is more efficiently diffused and circulated through the gas flow guiding cylinder 203. As a result, the fluorine gas can sufficiently contact the adsorbent 205 and thus the hydrogen fluoride is sufficiently adsorbed to the adsorbent 205 and thus efficiently removed from the fluorine gas.

It is preferable that the stirring blade 202 is positioned between the main-product gas feed port 51a and the adsorbent holding member 201 while being directed against the flowing direction of the fluorine gas that is led thereinto from the main-product gas feed port 51a. With such arrangement, the fluorine gas containing a highly concentrated hydrogen fluoride can be prevented from directly contacting the adsorbent 205 held in the adsorbent holding member 201. As a result, deterioration of the adsorbent 205 due to solidification and clogging of the adsorbent 205 due to pulverization can be effectively suppressed.

It is preferable to set the rotation speed of the stirring blade 202 at 300 to 2000 rpm. The more preferable rotation speed is 600 to 1500 rpm. When the rotation speed of the stirring blade 202 is lower than 300 rpm, the fluorine gas in the cylindrical member 31a is not uniformly stirred and thus adsorption of the hydrogen fluoride is not sufficiently carried out, and thus, concentration of hydrogen fluoride at the main-product gas feed port 51a is increased undesirably. While, when the rotation speed of the stirring blade 202 is higher than 2000 rpm, the stirring blade 202 tends to show an axial deflection thereby failing to carry out a smoothed stirring work, which is undesirable. Adjustment of gas flow is possible by varying the rotation speed of the stirring blade 202. It is preferable that an average linear speed of the gas running in the interior of the cylindrical member 31a is 0.03 m/sec to 5.0 m/sec. The more preferable average linear speed is 0.05 m/sec to 2.0 m/sec. For measuring the average linear speed of the gas running in the interior of the cylindrical member 31a, a commercially available anemometer can be used.

The stirring blade 202 has no special restriction on a type so long as it can stir and mix the fluorine gas running in the cylindrical member 31a. For example, the blade 202 may be of a puddle (flat) type, turbine type, screw type or ribbon type.

As a stirring device other than the above-mentioned stirring blade 202, there can be used a device in which stirring and mixing are carried out by a stirring rod, a device in which for stirring and mixing the gas, a pump is used which circulates the gas in the interior or a device in which a temperature gradient is produced in the cylindrical member 31a to induce a gas flow for effecting the gas stirring and mixing. Among them, the stirring blade is most preferable because it is simple and can efficiently stir the gas.

In FIG. 2, the main-product gas feed port 51a and the main-product gas discharge port 52a are shown to have such a positional relation that the ports 51a and 52a are provided on the same side of the cylindrical member 31a. However, the present invention is not limited to such positional relation. That is, the main-product gas feed port 51a and the main-product gas discharge port 52a may be provided on axially opposed sides of the cylindrical member 31a respectively, or the ports 51a and 52a may be provided on opposed side walls of the cylindrical member 31a respectively.

The staying time or resident time of the fluorine gas in the cylindrical member 31a is to be set in accordance with a working condition of the fluorine gas generating device that is actually operated. However, as a common condition, the staying time is preferably 10 to 100 minutes, and more preferably 20 to 75 minutes. When the staying time is set shorter than 10 minutes, the time period during which the fluorine gas and the adsorbent 205 contact is not sufficient, and thus HF concentration at the gas discharge port is increased and thus the device fails to exhibit a satisfied refining performance as the refining device. While, when the staying time is set longer than 100 minutes, the refining device becomes excessively large in size as compared with the gas treatment amount, and thus, it is not preferable. The volume of the cylindrical member 31a should be suitably determined in accordance with the amount of flow of the main-product gas and the staying time of the gas flow in the cylindrical member 31a.

The cylindrical member now mentioned is a vessel that houses therein an adsorbent for adsorbing hydrogen fluoride and causes fluorine gas generated in the electrolytic tank 1 to flow therethrough for adsorbing and removing the hydrogen fluoride contained in the fluorine gas. That is, the cylindrical member has no special restriction on shape. The cylindrical member may be preferably made of a material that has a resistance against the fluorine gas and hydrogen fluoride gas, which is, for example, stainless steel, monel, nickel or their alloy.

As the adsorbent 205, pellet form sodium fluoride (NaF) (viz., NaF pellet) is usable. An adsorbing capability of sodium fluoride is varied with a change in temperature. Thus, around the cylindrical member 31a, there is mounted a heater 41a as a temperature regulator that regulates an inside temperature of the cylindrical member 31a. The temperature regulator has no special restriction on type so long as it can regulate the inside temperature of the cylindrical member 31a. For example, a heater, a device using steam heating or a heating/cooling device using heating medium and cooling medium is usable as the temperature regulator.

As the agent of the adsorbent 205, alkali metal fluoride, such as, NaF, KF, RbF, CsF or the like is usable. Among them, NaF (sodium fluoride) is most preferable. In general, sodium fluoride changes the adsorbing capability to hydrogen fluoride with a change in temperature, and exhibits a higher adsorbing capacity in a lower temperature. In general, sodium fluoride is set to a temperature of 20° C. to 100° C. When the set temperature is higher than 100° C., the adsorbent fails to adsorb HF sufficiently.

In the refining device 20 of the invention, the gas in the cylindrical member 31a is sufficiently circulated and diffused in the cylindrical member 31a, and thus, it does not frequently occur that the fluorine gas containing therein highly concentrated HF contacts the adsorbent. Accordingly, even if the adsorption of HF is carried out at a normal temperature of about 20 to 30° C., deterioration and pulverization of the adsorbent caused by solidification of NaF pellets is suppressed. Accordingly, in the refining device 20 of the invention, the interior of the cylindrical member 31a is set to a lower or normal temperature to increase the adsorbing capability of NaF pellets. With this, HF adsorption is efficiently carried out.

[Other Embodiments]

In the invention, other embodiments are provided in addition to the above-mentioned embodiment. That is, in another embodiment, a circulation passage 53a is provided through which part of the main-product gas discharged from the cylindrical member 31a is circulated and led into the cylindrical member 31a again.

The method of circulating part of the main-product gas discharged from the cylindrical member 31a has no special restriction on type. However, as shown in FIG. 2, a method of using a compression pump 206 or a blower (not shown) is preferable because it is simple and common. Furthermore, if desired, the circulation passage 53a may be provided with a valve or the like (not shown).

In the above-mentioned embodiment, the main-product gas flowing in the cylindrical member 31a can be much uniformly stirred, and thus, the adsorbent can be usefully and effectively used.

As a still another embodiment, an arrangement may be adopted in which two or more refining devices 20 are provided to form a series of process lines and these devices are alternately is operated while causing each device to carry out regeneration of the NaF pellets with the aid of heat after adsorption of HF by the NaF pellets.

The present invention is not limited to the above-mentioned embodiments. That is, it is apparent that various modifications and variations are carried out in a scope of technical concept of the invention.

For example, the refining device may be provided at both the anode side where fluorine gas is generated and the cathode side where hydrogen gas is generated. Furthermore, the refining device may be provided at only the cathode side where hydrogen gas is generated. Furthermore, an additional refining device may be arranged at a rear stage of the above-mentioned refining device of the invention.

INDUSTRIAL FIELD WHERE INVENTION IS USED

The present invention is applicable to a device that generates fluorine gas.

Embodiments

In the following, the present invention will be described in detail with reference to embodiments. However, the present invention is not limited to the embodiments.

Refining capability tests were carried out by a refining devices that is applicable to the embodiment of the invention as shown in FIG. 2. In the tests, concentration of hydrogen fluoride contained in the gas was measured at both the main-product gas feed port and main-product gas discharge port of the refining device that was repeatedly used.

[First Embodiment]

Within a cylindrical member (reaction capacity is 15 L) that has a gas flow guiding cylinder installed therein for gas circulation and diffusion and has a diameter of 200 mm and a length of 1500 mm, a tray-like vessel (adsorbent holding member 201) made of meshes of metal (mesh interval is 1 mm) was installed in such a manner as to define of form in the cylindrical member a space for forming a gas flow channel, the tray-like vessel having five stages in construction. As the tray-type vessel, a rectangular tray-type vessel was used, and pellet form sodium fluoride (NaF pellet) was filled in the vessel by such an amount that a height of the bulk of NaF pellets indicates 50% of the height 20 mm of the tray-type vessel. The gas flow guiding cylinder and the tray-type vessel were those made of a stainless steel.

As is seen from FIG. 2, as the gas flow guiding cylinder, a cylindrical member having longitudinal both ends opened was used. One end portion of the guiding cylinder was tapered to show a conical shape and the opening of the end portion was generally circular. The gas flow guiding cylinder was concentrically arranged in the cylindrical member in such a manner that the tapered portion of the gas flow guiding cylinder is directed toward the gas feed port of the cylindrical member, so that an outer cylindrical surface of the gas flow guiding cylinder extends along an inner cylindrical surface of the cylindrical member.

As is seen from FIG. 2, the stirring blade was arranged between the gas feed port and the adsorbent holding member and placed in the opening of the end of the gas flow guiding cylinder in such a manner that the stirring blade is directed toward the direction in which the gas from the gas feed port is led. The diameter of the stirring blade was substantially the same as that of the opening of the end of the gas flow guiding cylinder. Actually, the end of the gas flow guiding cylinder was tapered to reduce the size thereof to the size of the diameter of the stirring blade. The stirring blade actually used was of a screw type having a diameter of 100 mm. The rotation speed of the stirring blade was set to 600 rpm to cause the gas linear speed in the cylindrical member to show 0.05 m/s for carrying out stirring of the gas. The gas linear speed was measured by an anemometer placed between the third and fourth trays.

As is mentioned hereinabove, for carrying out the refining capability test, the gas glow guiding cylinder was set in the cylindrical member and by the work of the stirring blade, the gas led into the cylindrical member was sufficiently circulated and diffused in the cylindrical member in order to suppress the highly concentrated hydrogen fluoride from contacting the adsorbent.

As a sample gas, 9% hydrogen fluoride gas diluted by nitrogen gas was used, which was circulated in the cylindrical member to show a staying time of 30 minutes. During this, the cylindrical member was not heated. The concentration of hydrogen fluoride at the gas discharge port was measured by a Fourier-transform infrared spectroscope (FT-IR).

By controlling the heater mounted around the cylindrical member, the temperature of the cylindrical member was adjusted to 250° C., and operation for removing hydrogen fluoride from the adsorbent (sodium fluoride) was carried out by circulating nitrogen gas in the cylindrical member in such a manner that the nitrogen gas shows a staying time of 3 minutes.

Thereafter, the adsorption process for adsorbing hydrogen fluoride to the adsorbent and the removing process for removing hydrogen fluoride from the adsorbent were carried out for five times respectively. During this, concentration of the hydrogen fluoride was measured for each time. After the removing process was finally finished, the NaF pellets in the tray were observed. The tests were carried out under a condition in which 9% hydrogen fluoride gas diluted by nitrogen gas was circulated in the cylindrical member at a circulation rate of 0.55 L/min. During these tests, the total amount of 9% hydrogen fluoride gas circulated was 3000 L. Even after completing the five repeat tests, undesired pulverization and adhesion of the NaF pellets in the tray type vessel were not found. Furthermore, the concentration of hydrogen fluoride at the gas discharge port was smaller than 5000 ppm for each of the five times.

After completion of the refining tests, increase in weight of the tray-type vessels that hold the NaF pellets having HF adsorbed thereto was measured (viz., measuring of increase in weight of the vessels after adsorption of HF), and it was found that increases of the weight of the vessels were substantially the same.

From the above-mentioned results, it is proved that by using the refining device of the present invention, the HF adsorption process can be more efficiently carried out without heating the cylindrical member, that is, under a condition of higher adsorbing capacity at a normal temperature. Furthermore, since increases in weight of the trays after completion of the repeat refining tests were substantially the same, it is proved that in the refining device of the invention, adsorption of HF is not effected at partial or limited portions but effected almost equally throughout the trays, and it is proved that load of the adsorbent is reduced and the adsorbent can be efficiently used until its utilization limit.

[First Comparative Example]

In a first comparative example, substantially the same refining capability tests were applied to an arrangement that has no means corresponding to the stirring blade and gas flow guiding cylinder of the above-mentioned first embodiment.

The test results showed that immediately after starting of the gas flow, the hydrogen fluoride concentration at the gas discharge port was around 9000 ppm showing that hydrogen fluoride was not sufficiently adsorbed. Thus, from the first comparative example, satisfied refining capability was not obtained.

Like the above-mentioned first embodiment, in the test of the first comparative example, 9% hydrogen fluoride gas of 3000 L in volume was circulated in the cylindrical member at a circulation rate of 0.55 L/min, and thereafter, the cylindrical member was dismantled and the NaF pellets in the tray was observed. It was found that NaF pellets placed near the gas feed port were partially solidified due to fusion and thus deterioration of the adsorbent was confirmed.

By comparing the result of [first embodiment] with the result of [first comparative example], it is proved that by stirring the interior of a cylindrical member of the refining device and providing a guiding cylinder for circulating and diffusing the gas, advantageous matters, such as long keeping of sufficient refining capability, suppression of deterioration of the adsorbent and effective and practical usage of the adsorbent until its utilization limit are obtained.

DESCRIPTION OF REFERENCE NUMERALS 100 fluorine gas generator
1 electrolytic tank
2 fluorine gas feeding system
3 by-product feeding system
4 external device
5 material feeding system
7 anode
8 cathode
11a first air chamber
12a second air chamber
15 first main passage
17 first pump
20 refining device
30 second main passage
31 second pump 51a main-product gas feed port
52a main-product gas discharge port
201 adsorbent holding member
202 stirring blade
203 gas flow guiding cylinder
205 adsorbent

The invention claimed is:

1. A fluorine gas generating device that generates fluorine gas by electrolyzing hydrogen fluoride in molten salt containing the hydrogen fluoride, the fluorine gas generating device comprising:
   an electrolytic tank that generates at an anode side a main-product gas, containing fluorine gas as a main component, and at a cathode side a by-product gas, containing hydrogen gas as a main component, by electrolyzing hydrogen fluoride in the molten salt in the electrolytic tank; and
   a refining device that removes hydrogen fluoride mixed with the main-product gas by using an adsorbent, wherein the refining device comprises:
   a cylindrical member for receiving therein the main-product gas,
   a gas feed port for introducing the main-product gas into the cylindrical member,
   a gas discharge port for discharging the main-product gas from the cylindrical member,
   an adsorbent holding member holding the adsorbent,
   wherein the adsorbent holding member is installed in the cylindrical member in a manner to form a gas flow channel,
   a gas flow guiding cylinder installed in the cylindrical member around the adsorbent holding member, wherein the main-product gas can be guided along the inner and outer cylindrical surfaces of the gas flow guiding cylinder; and
   a stirring blade arranged to force the main-product gas just led into the cylindrical member from the gas feed port to flow toward an outer channel while suppressing a direct flow of the main-product gas toward the adsorbent holding member;
   wherein the stirring blade is arranged between the gas feed port and the adsorbent holding member with respect to a direction in which the main-product gas from the gas feed port is directed, and
   wherein the stirring blade is rotated in a direction to force the main-product gas from the gas feed port back toward the gas feed port.

2. A fluorine gas generating device as claimed in claim 1, in which the gas flow guiding cylinder has a tubular shape with both ends opened and the gas flow guiding cylinder is arranged in the cylindrical member to extend along an inner surface of the cylindrical member.

3. A fluorine gas generating device as claimed in claim 1, further comprising a circulation channel that circulates part of the main-product gas discharged from the cylindrical member and thereafter leads the part of the main-product gas into the cylindrical member again.

* * * * *